United States Patent [19]

Michael

[11] Patent Number: 5,987,172

[45] Date of Patent: Nov. 16, 1999

[54] EDGE PEAK CONTOUR TRACKER

[75] Inventor: David Michael, Newton, Mass.

[73] Assignee: Cognex Corp., Natick, Mass.

[21] Appl. No.: 08/567,946

[22] Filed: Dec. 6, 1995

[51] Int. Cl.$^6$ .................................................. G06K 9/48
[52] U.S. Cl. ............................................................ 382/199
[58] Field of Search .................................... 382/199, 197, 382/266, 242

[56] References Cited

U.S. PATENT DOCUMENTS

| | | |
|---|---|---|
| 4,183,013 | 1/1980 | Agrawala et al. . |
| 4,570,180 | 2/1986 | Baier et al. . |
| 4,972,495 | 11/1990 | Blike et al. ............................. 382/199 |
| 5,081,689 | 1/1992 | Meyer et al. ........................... 382/199 |
| 5,398,292 | 3/1995 | Aoyama .................................. 382/199 |

*Primary Examiner*—Leo H. Boudreau
*Assistant Examiner*—Phuoc Tran
*Attorney, Agent, or Firm*—Russ Weinzimmer

[57] ABSTRACT

A method and apparatus for finding an edge contour in an image of an object is provided that is robust against object/background misclassification due to non-uniform illumination across an image, while also being computationally efficient, and avoiding the need to select a classification threshold. The invention can be used to partition an image of a scene into object regions and background regions, or foreground regions and background regions, using edge contours found in the image. The invention is particularly useful for analysis of images of back-lit objects. The edge contour is progressively formed by finding a sequence of one-dimensional edge positions, each one-dimensional edge position being determined by processing a set of pixels arranged along at least one imaginary line.

17 Claims, 10 Drawing Sheets

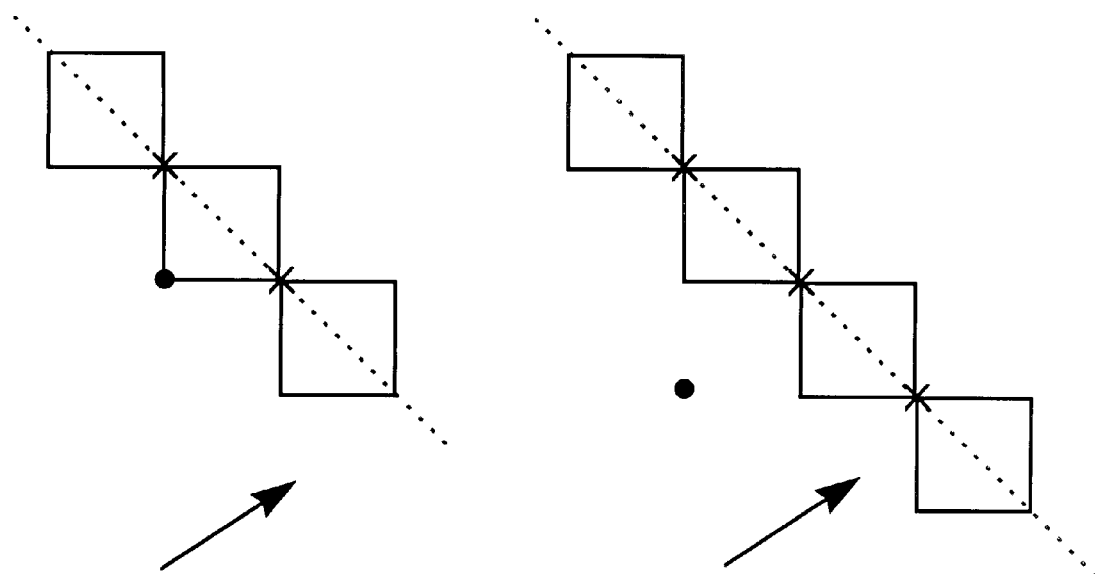
FIG. 5M
FIG. 5M'
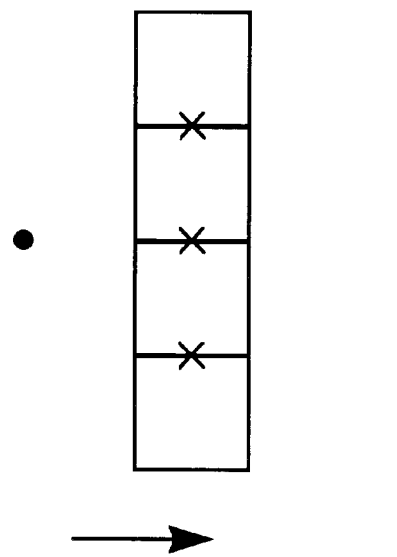
FIG. 5A'

EDGE PEAK CONTOUR TRACKER

FIELD OF THE INVENTION

This invention relates generally to computer vision, and particularly to image analysis.

BACKGROUND OF THE INVENTION

Commonly, an image is formed to represent a scene of interest that can include one or more physical objects on a background. In computer vision, an image typically consists of a two-dimensional array of picture elements, called pixels. Pixels can be square, rectangular, or hexagonal, for example. Each pixel is associated with a gray value, and each gray value can range from 0 to 255, for example. The gray value of each pixel is determined by the visual properties of the portion of the scene represented by that pixel.

An important task involved in analyzing images is differentiating between an object and background of an image, or between the foreground generally and the background of an image. The visual properties of an object are usually different from the visual properties of the background. Thus, the gray values of the portion of the image that represents the object will on average be different from the gray values of the portion of the image that represents the background.

It is known to differentiate an object from the background by comparing each pixel in an image with a single threshold gray value. If the gray value of the pixel is above the threshold gray value, then it can be categorized as object or foreground; if the gray value of the pixel is equal to or below the threshold gray value, then it can be categorized as background. Note that the threshold is static, non-adaptive, and is applied globally, in that each and every pixel in the image is compared with the same threshold.

One drawback to this approach is that, due to non-uniform illumination across an image which can make one side of the scene darker than another, object portions of the image can easily be misclassified as background portions, and vice versa. Another disadvantage is that each pixel of the image must be processed. Since computation time is proportional to the number of pixels processed, this approach can present a computational burden when there are large images, or when many images must be processed rapidly, for example.

Another way to differentiate an object from the background is to start with a single pixel on the object/background boundary, and to compare each pixel in the neighborhood of the pixel to a single threshold gray value. If the neighborhood pixel is above the threshold, it is an object pixel; if it is below the threshold, it is a background pixel. The transition from object pixel to background pixel is the boundary, and it can be further localized with an interpolation step. The neighborhood pixel that is closest to the boundary is then selected, and each of its neighboring pixels is compared to the single threshold gray value. The process is repeated, resulting in a sequence of pixels that tracks the boundary of an object. An example of this technique is the Cognex Boundary Tracker, sold by Cognex Corporation, Natick Mass.

Although this method processes less pixels than the previous method that processes every pixel in an image by only processing pixels in a narrow band around each object/background boundary, it also suffers from the problem of classification error due to non-uniform illumination across an image.

A third way to locate the boundary between object and background is to first perform "edge detection" on the image. An edge is usefully defined as a change in gray value from dark to light or from light to dark that can span many pixels. Since the gray values of the image that represent the object will on average be different from the gray values that represent the background, there is an extended band or chain of pixels that have gray values that transition between the gray values of the object and the background. This extended band or chain of pixels is called an "edge contour". Thus, an edge contour indicates the boundary between an object and the background.

In "edge detection", the entire image is processed so as to label each pixel of the image as being either on an edge or not on an edge. Since every pixel in the image is processed, this first step is very computationally expensive. Next, an "edge linking" step is performed wherein pixels on edges are combined into "edge contours" or "boundary chains" which defines the boundary between object and background. This step is also computationally expensive, because every pixel that has been labeled as being on an edge must be processed to determine whether it can be included in a boundary chain. Moreover, this method does not provide sub-pixel accuracy.

PROBLEMS TO BE SOLVED BY THE INVENTION

It is a goal of the invention to provide a method and apparatus for locating an edge contour that is robust against object/background misclassification due to non-uniform illumination across an image, and that is significantly more computationally efficient than the methods and apparatus of the prior art.

It is a goal of the invention to provide a method and apparatus for locating an edge contour that avoids the use of a gray value threshold, and thereby avoid the task of selecting a threshold to optimize classification of object and background.

It is a goal of the invention to provide a method and apparatus for edge contour tracking that avoids the use of a threshold gray value, and thereby avoids the associated misclassification errors due to non-uniform lighting across a scene.

SUMMARY OF THE INVENTION

A method and apparatus for finding an edge contour in an image of an object is provided wherein the edge contour is progressively formed by finding a sequence of one-dimensional edge positions, each one-dimensional edge position being determined by processing a set of pixels arranged along at least one imaginary line.

More particularly, the invention is a method for finding an edge contour in an image, where the edge contour is found by finding a sequence of contour points. The step of determining the position of a contour point includes locating the position of an edge in a one-dimensional gray value signal taken along a line across the projected edge contour, and then advancing to a next contour point based on each successive edge so-located.

In a preferred embodiment, the step of locating the position of an edge in a one-dimensional gray value signal includes the step of finding an interpolated edge peak. Other preferred embodiments find and exploit more than one one-dimensional edge position to determine the two-dimensional position and direction of the next edge contour point. It is preferable that when two one-dimensional edge positions are used to determine the two-dimensional position and direction of the next edge contour point, a pair of perpendicular imaginary lines and the associated pixels are used. The one-dimensional edge positions can be determined by analyzing an edge enhancement signal derived from the gray value signal taken along each imaginary line. According to the invention, the two dimensional position of each edge contour point can be found to sub-pixel accuracy.

The invention overcomes the drawbacks of the aforementioned approaches in that it is robust against object/background misclassification due to non-uniform illumination across an image, and is significantly more computationally efficient. Moreover, since no gray value threshold is used, the task of selecting a threshold to optimize classification of object and background is avoided.

Further, a threshold gray value is not needed to define the boundary, so the task of selecting a threshold to minimize classification errors is avoided. Moreover, since there is no threshold gray value, the associated misclassification errors due to non-uniform lighting across a scene are thereby avoided.

The invention can be used to partition an image of a scene into object regions and background regions, or foreground regions and background regions, using edge contours found in the image according to the method of the invention.

An edge contour is a continuous curve formed by a sequence of connected points at the interpolated maximum of the first derivative of the gray value signal taken across the boundary at each point. Since the edge contour is formed by a sequential local computation, i.e., sequentially finding the interpolated maximum so as to track a boundary, only pixels at or near the boundary are processed. Thus, significant computational efficiency is gained, because many pixels that are not near the boundary need not be processed.

The invention is particularly useful for analysis of images of back-lit objects. The invention can be used, for example, to provide information regarding the physical position and/or orientation of a physical object represented by an image, and such information can be used to control hardware resources, such as an aligner.

BRIEF DESCRIPTION OF THE DRAWINGS

The invention will be more fully understood from the following detailed description, in conjunction with the accompanying figures, wherein.

DETAILED DESCRIPTION OF THE PREFERRED EMBODIMENTS

Figure 1:
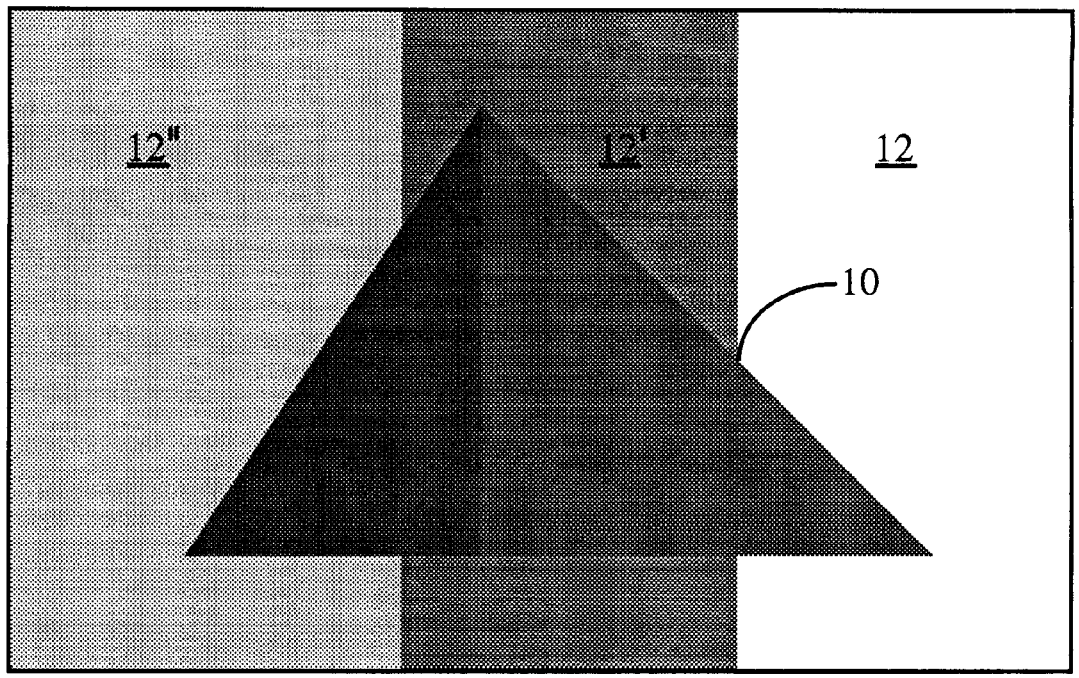
FIG. 1 shows an image of an object having two gray value regions against a background of three gray value regions, the varied gray values illustrating non-uniform illumination over the surface of the object and background.

Referring to FIG. 1, the invention finds edge contours, and so it can be used to find the boundary of an image of an object 10 against a background 12, 12', 12". The method of the invention can discriminate between edges of various strengths, and so it can find the boundary of the image of the triangle shown in FIG. 1, without being confused by the two gray value regions of the triangle, or by the background, here shown as having three gray value regions 12, 12', 12".

Moreover, FIG. 1 illustrates another advantage of the present invention; it can find the boundary of an object, even when varied gray values are present due to non-uniform illumination over the surface of the object and background.

Figure 1A:
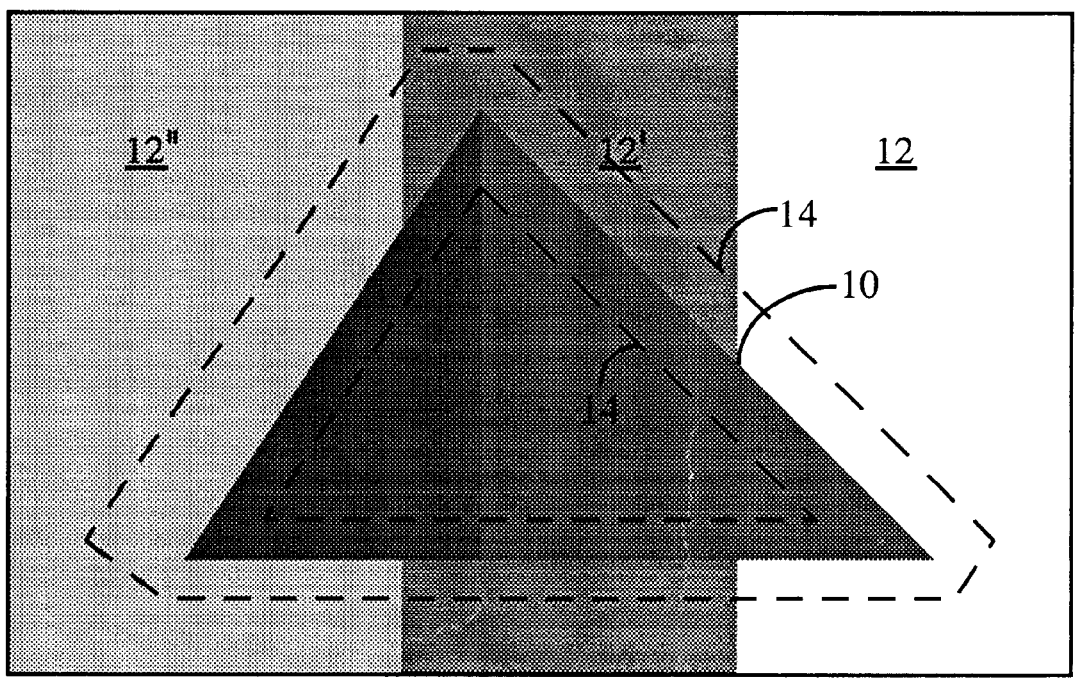
FIG. 1A shows the same object and background as in FIG. 1, also including a pair of dashed lines that enclose a region of pixels to be processed.

FIG. 1A shows the same object 10 and background 12, 12', 12" as in FIG. 1. A pair of dashed lines 14 are included to indicate a region of pixels to be sequentially processed according to the invention. Thus, the invention can find the boundary of an object without processing every pixel in an image; only the pixels in a local neighborhood of each point along the boundary are processed.

Figure 2:
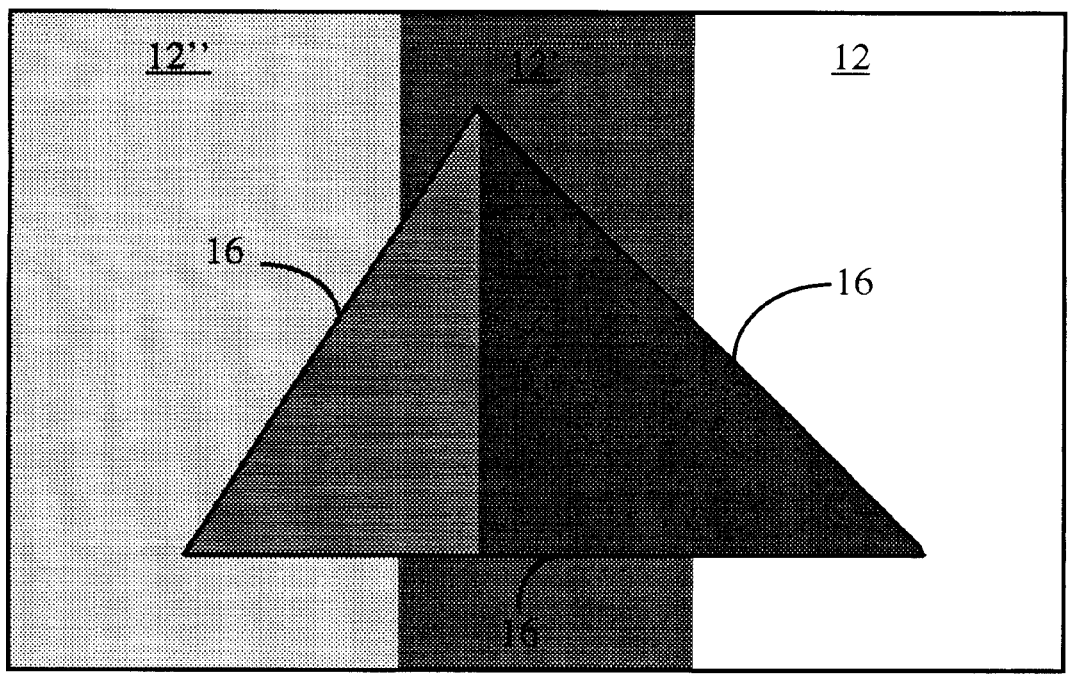
FIG. 2 shows the same object and background as in FIGS. 1 and 1A, also showing the boundary between the object and the background, as indicated by a closed thin black line.

FIG. 2 shows the same object and background as in FIGS. 1 and 1A. New to this figure is the boundary 16 between the object 10 and the background 12, 12', 12", as indicated by a thin black line 16 that extends around the entire triangular object 10.

Figure 3:
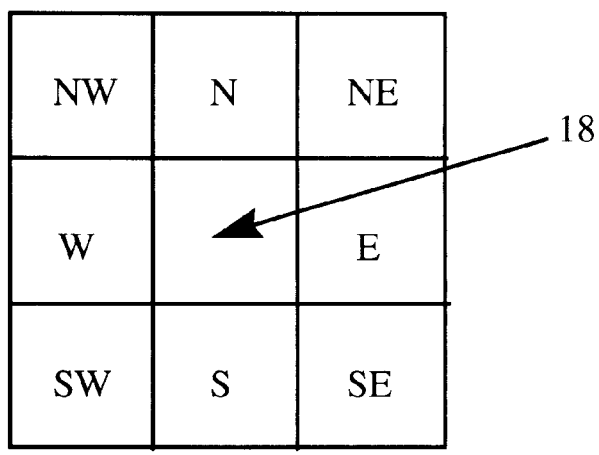
FIG. 3 shows the eight directions in the neighborhood of a single pixel.

An image consists of a regular array of pixels, which can be square, rectangular, triangular, or hexagonal, for example. FIG. 3 shows the eight directions in the neighborhood of a single square pixel 18, i.e., E, NE, N, NW, W, SW, S, and SE.

In the case of an image consisting of square pixels, there are two coordinate axes, e.g., a coordinate axis in the X-direction (left-to-right), and a coordinate axis in the Y-direction (down-to-up). These coordinate axes are also axes of symmetry of the array of square pixels. In addition, there are two other axes of symmetry of a square-pixel-based image, i.e., the diagonal spanning the upper-left corner and the lower-right corner of each pixel, and the diagonal spanning the lower-left corner and the upper-right corner of each pixel.

In a preferred embodiment, the invention exploits two axes of symmetry, where the two axes are preferably perpendicular with respect to each other. Specifically, a first difference signal is computed along one or both of two perpendicular axes, and the results are used to determine the direction of each boundary segment, as will be discussed further below.

So, referring again to FIG. 3, the direction of a boundary segment is preferably expressed, in the case of an image consisting of an array of square pixels, as one of the eight directions shown, i.e., E, NE, N, NW, W, SW, S, and SE.

Figure 4:
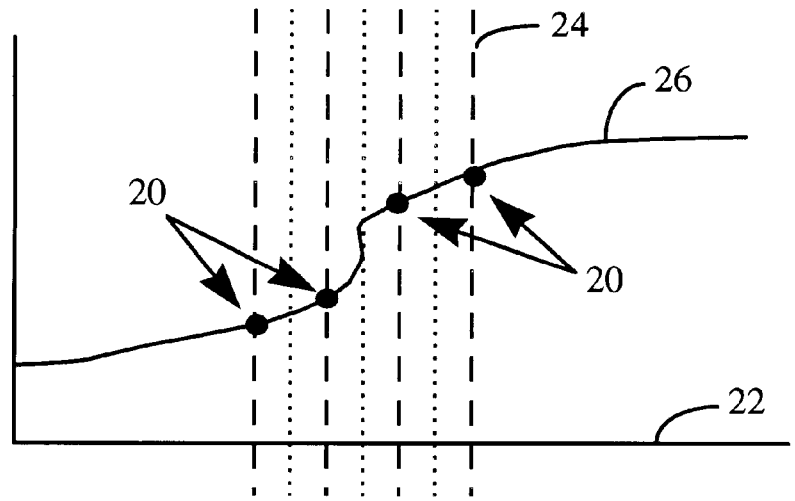
FIG. 4 is a plot of a gray value signal versus position taken across a boundary, indicating the gray values of four pixels at four locations across the boundary.
Figure 4A:
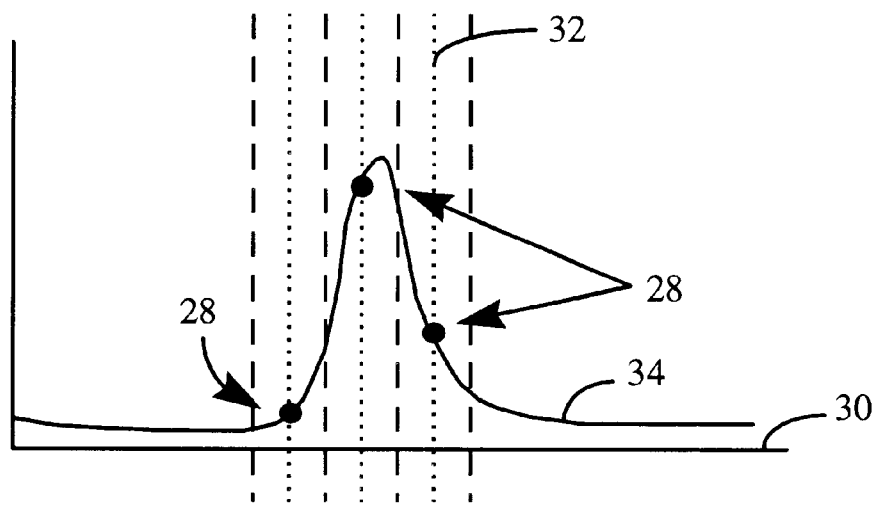
FIG. 4A is a plot of the first derivative of the signal of FIG. 4, indicating three first derivative values at three locations across the boundary.
Figure 4B:
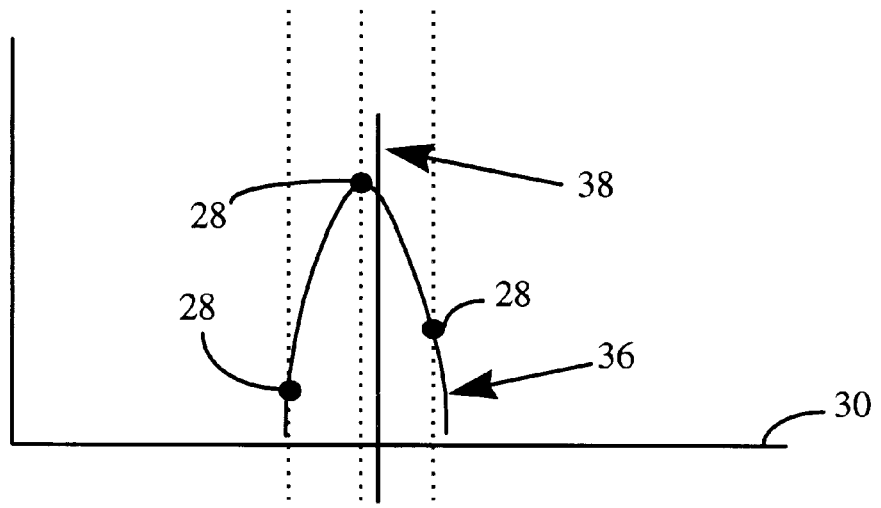
FIG. 4B is a plot showing the three first derivative values of FIG. 4A, and the parabolic interpolation curve that fits the three points.

By way of further background, referring to FIGS. 4, 4A, and 4B, an explanation of the terms "gray value signal", "first difference signal", and "interpolated first difference signal" will now be provided. An image consists of a regular array of pixels. Each pixel can have a gray value that falls within a range of allowable gray values, such as between 0 and 255. Thus, a pixel can be black (0), white (255), or any shade of gray in between from dark to light (1–254). A "gray value signal" is here defined as a sequence of gray values of the pixels traversed along a particular path in the image. The path can be straight or curved.

In the case of FIG. 4, a straight path was traversed, such as a purely horizontal path (not shown). The gray value of each of four pixels is indicated as the height of a black dot 20 above a horizontal axis 22. The horizontal position of each of the four pixels is indicated by a vertical heavy dotted line 24. A curve 26 is drawn through the four black dots 20 to suggest how the brightness of the underlying object may change along the horizontal path. Note that to the left the gray values are less (darker) than the gray values to the right (lighter), and that there is a transition between dark and light in the middle. The transition is a boundary between the dark region on the left and the light region on the right.

The character of the transition is further appreciated by plotting the "first difference signal", i.e., plotting the change in gray value from pixel to pixel along a given path. Here, in FIG. 4A, the given path is the same as the horizontal path traversed in FIG. 4. The first difference between each of three pairs of neighboring pixels is indicated as the height of a black dot 28 above a horizontal axis 30. The horizontal position of each of the three difference values is indicated by a vertical light-dotted line 32. A curve 34 is drawn through the three black dots 28 to suggest how the rate of change in brightness of the underlying object may vary along the horizontal path.

Note that both to the left and to the right, the gray values do not change very much, but note well that in the middle, there is a region of significant change. This region of change is called an "edge", or "edge contour".

Referring to FIG. 4B, the position of the edge contour is approximated by the largest of the values 28 of the first difference. A more accurate position of the edge can be obtained by fitting a curve to the values 28, and then finding the position of the maximum of this curve, i.e., interpolating or extrapolating to find the position of the edge contour to sub-pixel accuracy. For example, a parabola 36 can be fit to the three points 28, the maximum of the curve 36 being indicated by the thin vertical line 38 to the right of the greatest of the three points 28. Note again that is a sub-pixel position value. Even greater sub-pixel accuracy can be achieved if more first difference values are available, using a higher-order interpolation, such as a fourth order curve.

There are many other methods for determining a position of an edge in a one-dimensional gray value signal that provide the position value to sub-pixel accuracy. Thus, according to the invention, the following methods can be used as an alternative to the above-described method of finding the peak in a first difference signal to find the position of the edge contour to sub-pixel accuracy.

For example, there are linear filtering methods, non-linear filtering methods, statistical methods, and matched filtering methods. Linear filtering methods include the first difference operated described above, and also include a laplacian operator, and a difference-of-Gausians operator.

Non-linear methods include the square of the first difference, and the log of the first difference. An advantage of using the log of the first difference is that this operator is relatively insensitive to multiplicative changes in luminance level over an image.

Statistical methods include finding the window position of maximum variance for a window sliding along the one-dimensional gray value signal.

Matched filtering methods include finding the position that minimizes the mean squared error between an ideal edge profile and the one-dimensional gray value signal.

Each of the above methods for finding the position of an edge in a one-dimensional gray value signal will provide a position value, but the position value will differ from one method to another. Nevertheless, consistent use of any one of the above methods in the practice of the present invention will provide the location of an edge contour. Thus, the description of the preferred embodiment of the present invention that includes a discussion of the use of determining the position of a contour point by locating the peak of a first difference signal of a gray value signal taken across the edge contour, is for purposes of clarity of explanation, and in no way is meant to limit the scope of the present invention. The best method for finding the position of an edge in a one-dimensional gray value signal will depend to a large extent on the character of the image under analysis, and the particular requirements of the application domain.

Figure 5A:
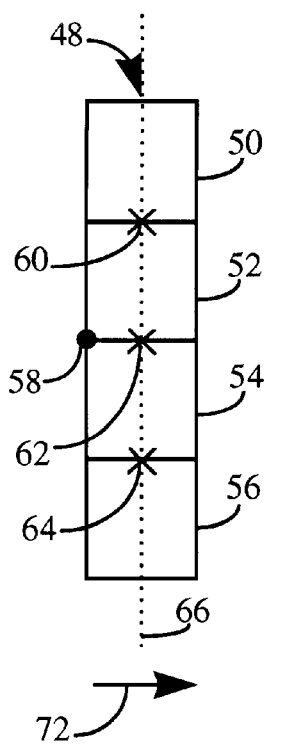
FIGS. 5 A–M' show a variety of pixel sets which are processed to determine the position and direction of each new edge contour point.
Figure 5B:
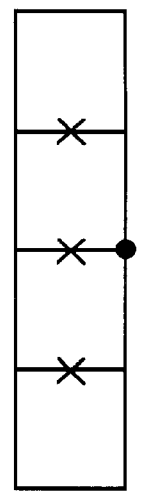
Figure 6:
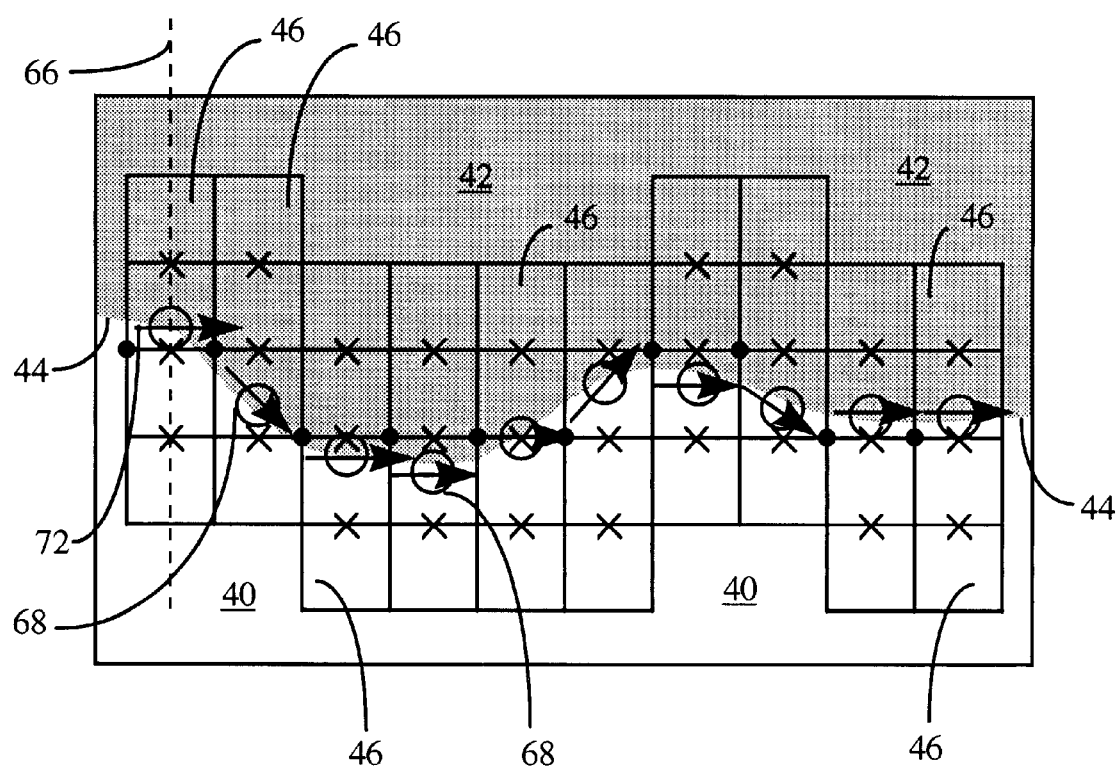
FIG. 6 is representation of a boundary, showing a sequence of sets of four pixels that are processed to obtain the edge contour point along an arbitrary segment of the boundary.

Referring to FIGS. 5A and 6, the pixel set shown in FIG. 5A will be used to find an edge contour according to the method of the invention. An example of a generally horizontal edge contour is shown in FIG. 6. A region of white pixels meets a region of gray pixels 42 along an edge contour 44. Each square 46 represents a pixel of an image that represents the underlying scene presented by regions 42 and 40. The gray value of each pixel is the average gray value over the area of each square 46.

The example shown in FIG. 6 repeatedly uses the same pixel set to track the edge contour 44. This set 48 is shown in FIG. 5A, and includes four pixels 50, 52, 54, and 56. The pixel set 48 is characterized by having an origin 58, here residing at the intersection of the left wall and the mid-line of the pixel set 48. The origin 58 is used as a reference point for specifying changes in position of the pixel set 48. The pixel set 48 also has three first difference positions, indicated by the three Xs 60, 62, and 64. Note that the three Xs are located along an imaginary vertical position axis of the pixel set 48, such as the vertical midline 66. Of course, consistent use of the left or right wall of the pixel set as the vertical position axis would work also. In the example of FIG. 6, the position of the edge contour point for each position of the pixel set 48 will be somewhere along the midline 66, which midline is not shown explicitly in FIG. 6.

In FIG. 6, each position of the edge contour point along the midline 66, for each position of the pixel set 48 along the boundary 44, is indicated generally by a circle 68, and particularly by the center of the circle 68. The position of an edge contour point can be anywhere along the midline 66, as is the case when interpolation or extrapolation techniques are employed. Alternatively, the position of an edge contour point can be restricted to one of the intersection points 60, 62, and 64. This can be accomplished, for example, by reporting the maximum of the three first difference values, and performing no extrapolation or interpolation, or by finding and reporting the nearest intersection point 60, 62, 64 to the found interpolated or extrapolated point.

Figure 5C:
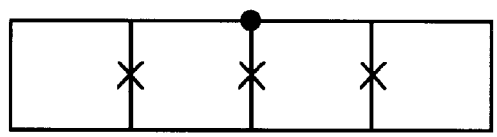
Figure 5D:
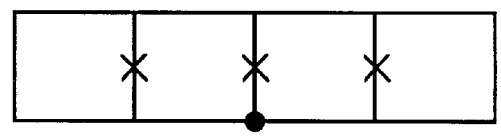
Figure 5E:
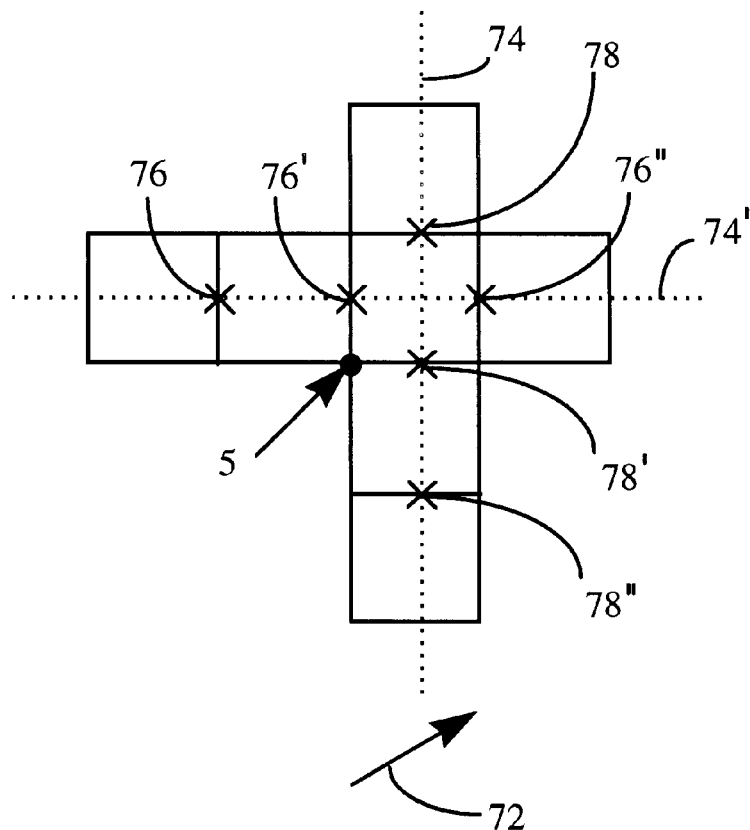
Figure 5F:
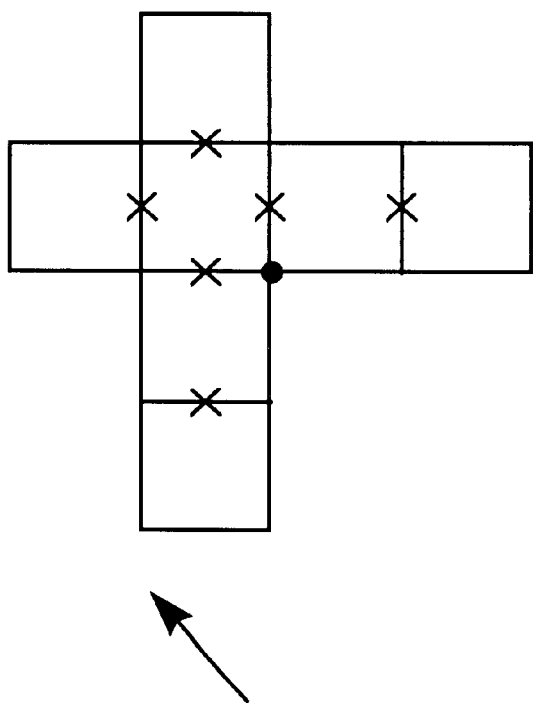
Figure 5G:
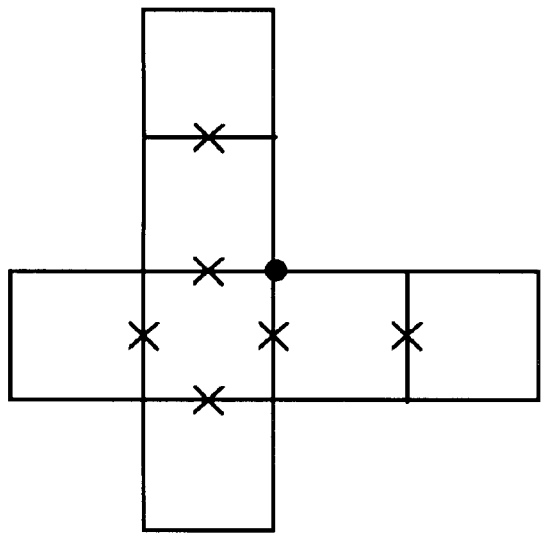
Figure 5H:
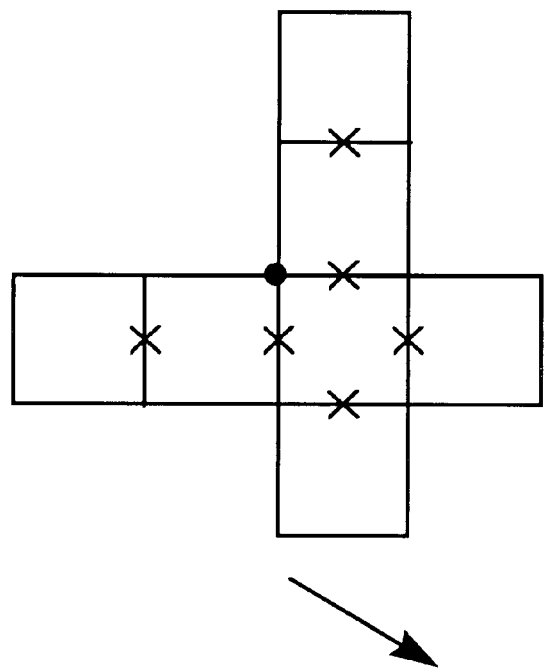
Figure 5I:
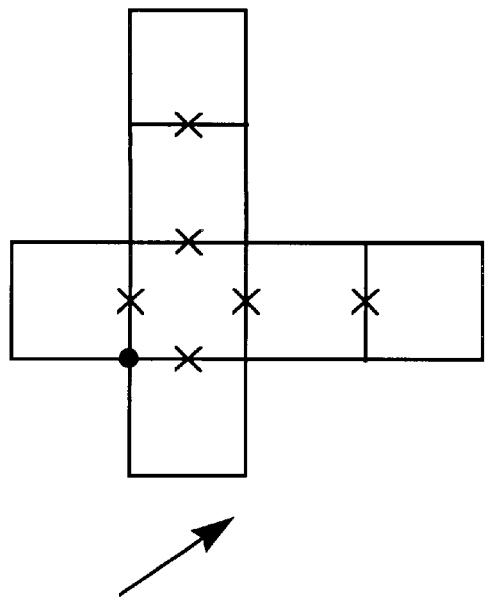
Figure 5J:
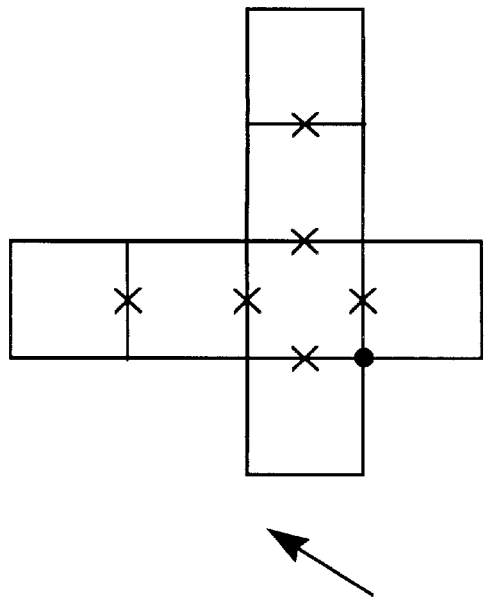
Figure 5K:
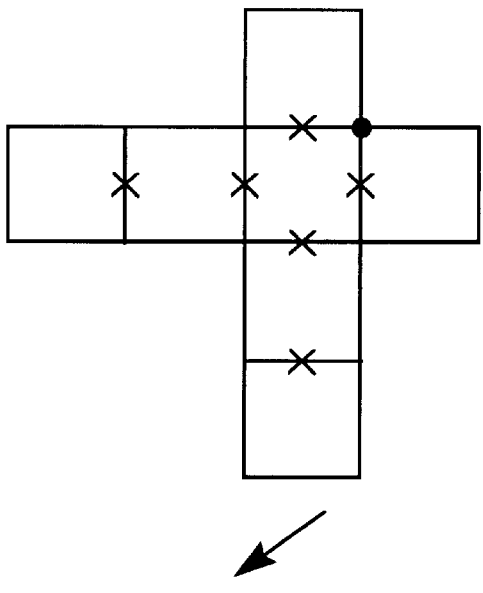
Figure 5L:
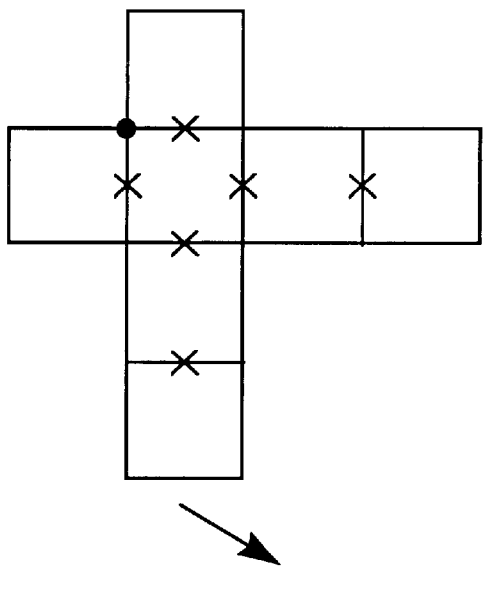

In the case where no edge contour point is found along the midline 66, i.e., the magnitude of the one-dimensional edge detection signal does not exceed a noise-filtering threshold, then one or more of the other pixels sets, such as 5B–5M, is used until an edge contour point is found, or until no such signal is found. In the event that no edge contour point is found, the edge contour is terminated. The use of other pixels sets, such as 5B–5M, will be explained further below. In this example, the position of each edge contour point is determined by a calculation of the first difference between each neighboring pair of pixels in the pixel set 48. As stated previously, other methods can be used that take the pixels of a pixel set as input, and provide the position of an edge contour point along the vertical position axis of the pixel set. FIGS. 5C, 5D, 5M, and 5M' illustrate that there are useful pixel sets that are arranged in configurations other than a vertical column. Thus, the position of an edge contour point is most generally expressed as the longitudinal position of the edge contour point along the longitudinal position axis of a pixel set.

The invention provides a series of edge contour points that together indicate the position of an edge contour in the image under analysis. The edge contour can correspond to a boundary between regions in the underlying scene. For example, a dark region can represent a semiconductor wafer, a bright region, a wafer handling stage, and the edge contour can represent the edge of the wafer. A curve can be fit to the series of boundary points that can be used to find interpolated positions of the edge contour between contour points. For example, a circle can be fit to the edge contour points found in the analysis of the image of a back-lit semiconductor wafer. Once the closest-fitting circle is found, the position of the center of that circle can be used as the position of the center of the wafer.

Figure 7:
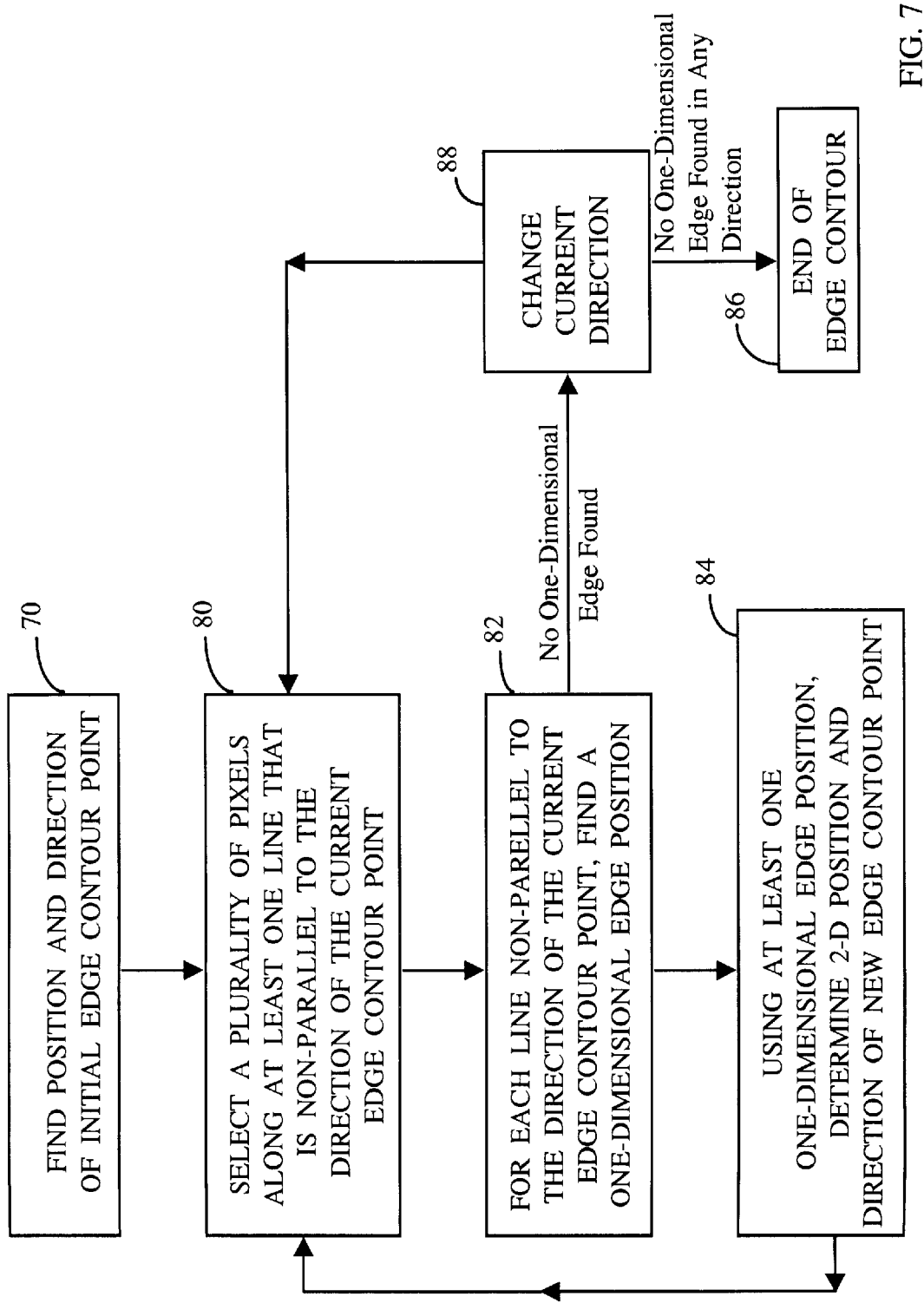
FIG. 7 is a flow chart illustrating the method of the invention.

Referring to FIG. 7, to provide a series of edge contour points, the position and direction of an initial edge contour point must first be found (70). Here, reference numbers within parentheses indicate method steps. This can be done by a variety of methods. For example, simple visual inspection by an operator, or use of an edge-finding tool, such as the CALIPER TOOL, sold by Cognex Corporation, Natick Mass. Based on the found position and direction of the initial edge contour point, the invention selects a plurality of pixels along at least one imaginary line in the image, e.g., 66, where each imaginary line is not parallel to the direction of the initial edge countour point. In a preferred embodiment, each imaginary line is preferably non-parallel with respect to each other imaginary line selected to determine the position and direction of the next contour edge point.

Referring to FIGS. 5A–5M', a variety of pixel sets are shown. Each pixel set is shown with a direction arrow 72. The direction arrow 72 indicates the direction of the current edge contour point after which the pixel set can primarily be used. The pixel set chosen based on the direction arrow 72 of the current edge contour point is then used to find the position and direction of the next edge contour point. For example, the pixel set of FIGS. 5A or 5A' can be used to find the sequence of edge contour points 68 that together indicate the position of the edge contour shown in FIG. 6. Note that the pixel set in FIGS. 5A and 5A' can also be used for both a northeast (NE) and a southeast (SE) directed current edge contour point, where the use of the pixel set in FIG. 5A is specifically illustrated in FIG. 6.

Each arrow 72 in FIG. 6 indicates the direction of the current edge contour point, and each circle 68 indicates the position of the current edge contour point, both of which are used to determine the vertical position of the next pixel set of FIG. 5A. Once selected, the pixel set in its new vertical position is used to find the position and direction of the next edge contour point. In general, the direction and position of the current edge contour point are used to determine the next pixel set, e. g., one selected from among those shown in FIGS. 5A–5M', and the position of the selected pixel set. The position of a pixel set is defined as the position of its origin 58.

For edge contours that potentially include large changes in edge contour angle over a small number of pixels, use of the pixel sets having pixels along more than one imaginary line, such as the pixel sets shown in FIGS. 5E–5L, can advantageously be used.

The pixel sets shown in FIGS. 5E–5L each include two subsets of pixels, each subset disposed along an imaginary line 74 that is non-parallel with respect to the direction 72 of the present edge contour point. Preferably, each imaginary line 74 is parallel with respect to a principle axis or an axis of symmetry of the pixel grid of the image.

To find the position and direction of the next edge contour point using all of the pixels of a pixel set as shown in FIGS. 5E–5L, the position and magnitude of a one-dimensional edge is found along each of the imaginary lines 74, 74'. In a preferred embodiment, each magnitude of a one-dimensional edge is compared with a noise-filter threshold, the threshold being set so as to reduce the likelihood that a spurious one-dimensional edge (one that is due to noise and not related to the underlying scene that the image represents) is considered.

In a preferred embodiment, to determine the direction of the current edge contour point, the magnitude of a one-dimensional edge found along a first imaginary line 74 is compared with the magnitude of a one-dimensional edge found along a second imaginary line 74'. The position of the one-dimensional edge of the greatest magnitude is then used to determine the direction of the current edge contour point. For example, if the magnitude of the one-dimensional edge found along the horizontal line 74' is found to be the largest, then the direction of the current edge contour point is determined by ascertaining which of the edge positions 76, 76', 76" (indicated by an 'x') along the horizontal imaginary line 74' is nearest. If the left-most 'x' is the nearest, then the direction of the current edge contour point is NW (See FIG. 3), and the position of the current edge contour point moves North one pixel, and West one pixel. If the right-most 'x' is the nearest, then the direction of the current edge contour point is NE, and the position of the current edge contour point moves North one pixel, and East one pixel. Lastly, if the center 'x' is the nearest, then the direction of the current edge contour point is N, and the position of the current edge contour point moves North one pixel.

Similarly, if the magnitude of the one-dimensional edge found along the vertical line 74 is found to be the largest, then the direction of the current edge contour point is determined by ascertaining which of the edge positions 78, 78', 78"(indicated by an 'x') along the vertical imaginary line 74 is nearest. If the top-most 'x' 78 is the nearest, then the direction of the current edge contour point is NE (See FIG. 3), and the position of the current edge contour point moves North one pixel, and East one pixel. If the bottom-most 'x' 78" is the nearest, then the direction of the current edge contour point is SE, and the position of the current edge contour point moves South one pixel, and East one pixel. Lastly, if the center 'x' 78' is the nearest, then the direction of the current edge contour point is E, and the position of the current edge contour point moves East one pixel.

In an alternate embodiment, to find the position and direction of the next edge contour point using all of the pixels of a pixel set as shown in FIGS. 5E–5L, the one-dimensional position and magnitude of a one-dimensional edge is found along each of the imaginary lines 74, 74'. A position and direction of a proposed next edge contour point is computed according to the method of the previous paragraph for each of the imaginary lines, given the one-dimensional position and magnitude of the one-dimensional edge found along each of the imaginary lines 74, 74'. In the case where the two proposed edge contour points differ in both direction and in the magnitude of its one-dimensional edge, and one of the directions of the two edge contour points is the same as the direction of the previous edge contour point, the following edge contour point selection rule is operative: The proposed edge contour point, having a direction that is different from the direction of the previous edge contour point, is selected to be the current edge contour point, only if the magnitude of its one-dimensional edge, exceeds by a minimum amount, the magnitude of the one dimensional edge of the proposed edge contour point, having a direction that is the same as the direction of the previous edge contour point. Note that if the minimum amount is zero, then the method described in this paragraph is the same as the method of the previous paragraph.

In a further alternate embodiment, for use with each of the embodiments of the previous two paragraphs, and only in the case where the two proposed edge contour points are of the same direction, the (2-D) position of the edge contour point is selected as follows: select a position that is intermediate the positions of each of the proposed edge contour points, the selected position being the weighted average of the positions of each of the proposed edge contour points, the positions being weighted in accordance with the magnitude of each respective one-dimensional edge.

In each of the previous descriptions of how to find the position and direction of the next edge contour point using all of the pixels of a pixel set as shown in FIGS. 5E–5L, the position and magnitude of a one-dimensional edge can be found along each of the imaginary lines 74, 74' using one of the following four methods: interpolating/extrapolating, interpolating/not-extrapolating, not-interpolating/ extrapolating, and not-interpolating/not-extrapolating. In applications such as finding the back-lit outline of a semiconductor wafer, interpolating/not-extrapolating is the preferred method.

With reference to FIG. 7, in general, the method of the invention for finding an edge contour in an image, the edge contour including a sequence of edge contour points, proceeds as follows. First, the two-dimensional (2-D) position and direction of an initial edge contour point is determined (70) using an edge detector, such as the Caliper Tool, sold by Cognex Corporation, Natick Mass. Next, using the 2-D position and direction of the initial edge contour point, a plurality of pixels are selected (80) along at least one imaginary line that is in non-parallel relationship with the direction of the initial edge contour point, or in subsequent steps, the current edge contour point. In a preferred embodiment, the imaginary line is parallel to a coordinate axis of the image.

Then, for each imaginary line, a one-dimensional edge position is found (82), using a technique such as finding the one-dimensional position of the peak of the first difference, or finding the zero-crossing of the second difference, of the gray value signal taken along each imaginary line. Next, using at least one one-dimensional edge position, the 2-D position and direction of the new edge contour boundary point are determined (84). With the 2-D position and direction of the new edge contour point, another plurality of pixels is then selected (80), and the process continues iteratively until the end of the edge contour is reached (86).

To determine when the end of the edge contour is reached, for each imaginary line, a one-dimensional edge position is sought (82). If no one-dimensional edge is found, then the direction of the current edge contour point is changed (88), and another plurality of pixels is selected along one or more different imaginary lines (80). For example, if the direction of the current edge contour point is East (E), and if no one-dimensional edge is found along the corresponding vertical imaginary line, then the direction of the current edge contour point is changed to North (N). If no one-dimensional edge is found along the corresponding horizontal imaginary line, then the direction of the current edge contour point can be changed to either South (S) or West (W). Alternatively, the direction can be changed by smaller increments, such as in the sequence NE, N, NW, W, etc., or NE, SE, N, S, etc., until either a one-dimensional edge is found, or until all allowed directions are explored, demonstrating that no one1 dimensional edge was found in any direction.

In yet another alternate embodiment, pixels along three imaginary lines can be searched for edge peaks, e.g., imaginary lines perpendicular to the NW, N, and NE directions. If no edge peak is found, another three imaginary lines can be searched, such as lines perpendicular to the SW, W, and NW directions.

In a further alternate embodiment, if no one-dimensional peak is found along an imaginary line that traverses N pixels, where N is preferably equal to four, then one or more pixels can be added to the subset of pixels disposed along that imaginary line, and the one-dimensional peak can be sought again. If it a peak is not found after one or more pixels have been added, the direction of the imaginary line can be changed, as described above.

In a preferred embodiment of the invention, the step of finding a one-dimensional edge position includes the step of locating the peak of a first difference signal, and in a further preferred embodiment, includes the step of using the first difference signal to find an interpolated peak. Preferably, the first difference signal includes at least three data points.

It should be appreciated that all of the above-described method steps can advantageously be executed on a general purpose computer, and can also be advantageously instantiated as specialized hardware, such as a gate array, an application specific integrated circuit, or as a custom integrated circuit chip. Also, the invention also includes the method steps explained herein expressed as computer-readable instructions, and stored on a magnetic media, such as a magnetic disk or tape, to provide an article of manufacture that embodies the invention.

Other modifications and implementations will occur to those skilled in the art without departing from the spirit and the scope of the invention as claimed. Accordingly, the above description is not intended to limit the invention except as indicated in the following claims.

What is claimed is:

1. A method for finding an edge contour in an image, the edge contour including a sequence of contour points, the method comprising the steps of:

determining the position of a current contour point by locating the peak of a first difference signal of a gray value signal using pixels of a pixel set extending across the edge contour;

advancing to determine the position of a next contour point using the position of the current countour point; and returning to the step of determining the position of a current countour point, the next contour point becoming the current contour point.

2. The method of claim 1, wherein locating the peak of a first difference signal includes the step of:

using said first difference signal to find an interpolated peak.

3. The method of claim 1, wherein the step of locating the peak of a first difference signal of a gray value signal using a pixel set extending across the edge contour is performed using pixels of the set that are disposed along a line parallel to a coordinate axis of the image.

4. The method of claim 1, wherein said first difference signal includes at least three data points.

5. The method of claim 1, wherein locating the peak of said first difference signal of a gray value signal is performed using a pixel set extending across the edge contour in a first direction, the method further including the step of:

locating the peak of a second first difference signal of a second gray value signal using pixels of the pixel set that are disposed across the edge contour in a second direction.

6. A method for finding an edge contour, the method comprising the steps of:

determining the position and direction of an initial current boundary point;

selecting a plurality of pixels along a first line that is non-parallel to the direction of said current boundary point;

computing a first difference signal along said plurality of pixels;

finding the position of a peak of said first difference signal;

using said position of said peak to determine a position and direction of a new current boundary point; and returning to the step of selecting a plurality of pixels.

7. The method of claim 6, further including the step of:

selecting a plurality of pixels along a second line that is non-parallel to the direction of said current boundary point, and that is non-parallel to the direction of said first line.

8. The method of claim 6, wherein said step of finding the position of a peak of said first difference signal includes the steps of:

fitting a curve to a plurality of data points of said first difference signal; and finding the position of a maximum of said curve.

9. The method of claim 6, further including the step of:

selecting a plurality of pixels along a third line that is non-parallel to the direction of said current boundary point, that is non-parallel to the direction of said first line, and that is that is non-parallel to the direction of said second line.

10. A method for finding an edge contour in an image, the edge contour including a plurality of contour points, the method comprising the steps of:

determining the position and direction of an initial current contour point;

selecting a plurality of pixels along a first line through said current contour point that is non-parallel to the direction of said current contour point;

computing an edge enhancement signal along said plurality of pixels;

finding the position of a peak of said edge enhancement signal;

using said position of said peak to determine a position and direction of a new current contour point; and returning to the step of selecting a plurality of pixels.

11. The method of claim 10, further including the step of:

selecting a plurality of pixels along a second line through said current contour point that is non-parallel to the direction of said current contour point, and that is non-parallel to the direction of said first line.

12. The method of claim 10, wherein said step of finding the position of a peak of said edge enhancement signal includes the steps of:

fitting a curve to a plurality of data points of said edge enhancement signal; and finding the position of a maximum of said curve.

13. The method of claim 10, further including the step of:

selecting a plurality of pixels along a third line through said current contour point that is non-parallel to the direction of said current contour point, that is non-parallel to the direction of said first line, and that is that is non-parallel to the direction of said second line.

14. An apparatus for finding an edge contour in an image, the edge contour including a plurality of contour points, the apparatus comprising:

initial determining means for determining the position and direction of an initial current contour point;

first selecting means, connected to said determining means, for selecting a plurality of pixels along a first line through said current contour point that is non-parallel to the direction of said current contour point;

computing means, connected to said first selecting means, for computing an edge enhancement signal along said plurality of pixels;

finding means, connected to said computing means, for finding the position of a peak of said edge enhancement signal; and new determining means, connected to said finding means and to said first selecting means, for using said position of said peak to determine a position and direction of a new current contour point.

15. The apparatus of claim 14, further comprising:

second selecting means, connected to said first selecting means, for selecting a plurality of pixels along a second line through said current contour point that is non-parallel to the direction of said current contour point, and that is non-parallel to the direction of said first line.

16. The apparatus of claim 14, wherein said finding means for finding the position of a peak of said edge enhancement signal includes:

fitting means for fitting a curve to a plurality of data points of said edge enhancement signal; and finding means, connected to said fitting means, for finding the position of a maximum of said curve.

17. The apparatus of claim 14, further comprising:

third selecting means, connected to said first selecting means, for selecting a plurality of pixels along a third line through said current contour point that is non-parallel to the direction of said current contour point, that is non-parallel to the direction of said first line, and that is that is non-parallel to the direction of said second line.

* * * * *